United States Patent [19]
Barrow et al.

[11] Patent Number: 5,359,281
[45] Date of Patent: Oct. 25, 1994

[54] QUICK-START AND OVERVOLTAGE PROTECTION FOR A SWITCHING REGULATOR CIRCUIT

[75] Inventors: Steven M. Barrow, Phoenix; Jade H. Alberkrack, Tempe, both of Ariz.

[73] Assignee: Motorola, Inc., Schaumburg, Ill.

[21] Appl. No.: 895,067

[22] Filed: Jun. 8, 1992

[51] Int. Cl.$^5$ ................................. G05F 1/56
[52] U.S. Cl. .................... 323/284; 323/901; 363/49; 361/18
[58] Field of Search .............. 363/21, 49; 323/282, 323/283, 284, 288, 351, 901; 361/18, 90, 91, 111; H02M 3/155

[56] References Cited

U.S. PATENT DOCUMENTS

| | | | |
|---|---|---|---|
| 4,563,733 | 1/1986 | Schlenk | 323/284 |
| 4,621,313 | 11/1986 | Kiteley | 363/49 |
| 4,625,271 | 11/1986 | Chetty et al. | 363/49 |
| 4,716,510 | 12/1987 | Pace et al. | 363/49 |
| 4,806,842 | 2/1989 | Bittner | 363/49 X |

Primary Examiner—Emanuel T. Voeltz
Attorney, Agent, or Firm—Robert D. Atkins

[57] ABSTRACT

A switching regulator controls the pulse width to a gate of a switching power transistor to maintain an average output voltage. An error amplifier in the regulation loop detects the difference between the actual output voltage and its desired value and maintains the proper regulation voltage at a loop node to control the pulse width to the gate of the power transistor. A quick-start circuit establishes a minimum loop regulation voltage at the loop node during power up allowing the error amplifier to begin regulating immediately thereby reducing start-up delay. The quick-start circuit is disabled after the loop node reaches the minimum loop regulation voltage. The switching regulator also monitors the output voltage by the same input pin to detect an overvoltage condition and shuts down the power switching transistor accordingly.

21 Claims, 3 Drawing Sheets

QUICK-START AND OVERVOLTAGE PROTECTION FOR A SWITCHING REGULATOR CIRCUIT

BACKGROUND OF THE INVENTION

The present invention relates in general to switching regulators and, more particularly, to a switching regulator circuit with a quick-start feature and overvoltage protection.

Switching power supplies find uses in a myriad of applications, including lighting ballast and power factor correction, for converting an AC or DC input voltage to a DC output signal. A switching power supply may utilize a pulse width modulator to rapidly switch a power transistor in the principal conduction path. The pulse width driving the power transistor determines the DC output voltage. A switching regulator control IC monitors the output voltage with an error amplifier and corrects the pulse width modulation to maintain the desired average output voltage to the load.

Conventional switching regulators that utilize a pulse width modulator with a "soft start" option must undergo a start-up delay when the circuit is powered up to establish a minimum loop regulation voltage for the error amplifier to begin controlling the pulse width modulator. After the start-up delay, the regulator increases the loop regulation voltage during the "soft start" phase as it approaches steady state operation. Prior art applications typically charge an external capacitor at a relatively slow rate to develop the minimum loop regulation voltage. The start-up delay can be quite long depending on the charging current source and the value of the external capacitor. The charging current source to the external capacitor operates continuously and must be keep small to minimize power consumption. Thus, there is a trade-off between start-up delay and power consumption.

Another problem with the prior art switching regulator circuit is the need to detect an output overvoltage condition during initial power-up or when the load is removed. The output voltage tends to shoot up if the load is removed. Therefore, it is desirable to sense the overvoltage condition and disable the switching power transistor as quickly as possible. The error amplifier and normal regulation loop operate at a low frequency for stability and therefore cannot respond in time to an overvoltage condition to shut down the switching regulator before possible damage occurs.

Hence, a need exists for an improved switching regulator for power supply control, or power factor control using low bandwidth (20 Hz), that eliminates start-up delay during power-up and further capable of quickly shutting down the switching power transistor should an overvoltage condition occur at the output.

SUMMARY OF THE INVENTION

Briefly stated, the invention comprises a switching regulator circuit including a power converter having an input receiving an input signal, an output coupled to an output of the switching regulator circuit for providing an output voltage, and a control input receiving a control signal to regulate the output voltage. A regulation loop includes an input coupled to the output of the power converter and an output coupled to the control input of the power converter. The regulation loop develops a loop regulation voltage at a loop node for comparison against an oscillating signal to establish a duty cycle of the oscillating signal to control the output voltage of the switching regulator circuit. A circuit includes an output coupled to the loop node for increasing the loop regulation voltage during power-up of the switching regulator circuit until the loop regulation voltage reaches a predetermined value.

In another aspect, the present invention is a switching regulator circuit including a power converter having an input receiving an input signal, an output coupled to an output of the switching regulator circuit for providing an output voltage, and a control input receiving a control signal to regulate the output voltage. The power converter includes a second output for providing a second output signal proportional to the input signal. An error amplifier includes a first input receiving a first reference potential, and a second input coupled to the output of the power converter for receiving the output voltage. A first capacitor is coupled between the output of the error amplifier and a first power supply conductor. A first comparator includes a first input coupled to the second output of the power converter, a second input coupled to the output of the error amplifier, and an output coupled to the control input of the power converter for providing the control signal. A second comparator includes a first input coupled to the output of the power converter for receiving the output voltage, a second input receiving a second reference potential, and an output coupled to the control input of the power converter.

DETAILED DESCRIPTION OF THE PREFERRED EMBODIMENT

Figure 1:
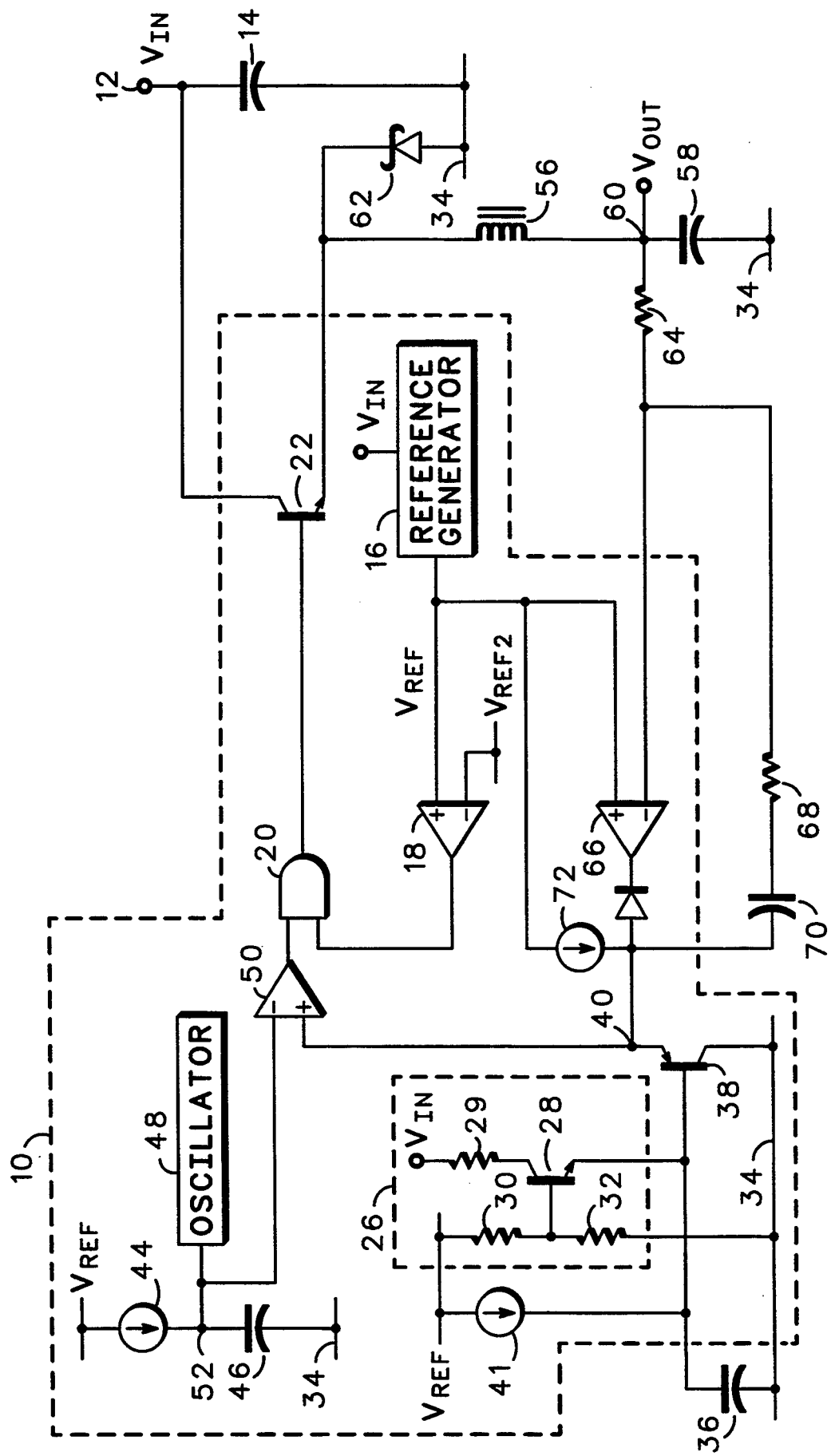
FIG. 1 is a schematic and block diagram illustrating a quick-start circuit for a first switching regulator.

Referring to FIG. 1, a DC-DC switching regulator 10 is shown suitable for manufacturing as an integrated circuit using conventional integrated circuit processes. Components shown external to switching regulator 10 are typically provided external to the integrated circuit. A DC input voltage $V_{IN}$ of say 10 volts is applied at terminal 12 and charges filter capacitor 14. The input signal $V_{IN}$ is also applied to reference voltage generator 16 which produces DC reference voltage $V_{REF}$ operating at 2.5 volts internal to the IC.

Comparator 18 operates as an undervoltage lock-out with hysterisis to detect when the reference voltage $V_{REF}$, and correspondingly the input voltage $V_{IN}$, is less than a predetermined threshold. When the reference voltage $V_{REF}$ is less than a reference voltage $V_{REF2}$ (2.0 volts), the output of comparator 18 is logic zero. AND gate 20 receives the logic zero from the output of comparator 18 and disables switching power transistor 22. When the reference voltage $V_{REF}$ becomes greater than the voltage $V_{REF2}$, the output of comparator 18 goes to logic one thereby removing the disabling lock-out feature. Thus, the undervoltage lock-out inhibits switching regulator 10 until the input voltage $V_{IN}$ is applied and reference voltage $V_{REF}$ comes up.

As part of the present invention, quick-start circuit 26 includes transistor 28 having a collector coupled for receiving the input voltage $V_{IN}$ through current limiting resistor 29. The base of transistor 28 is coupled to the interconnection of voltage dividing resistors 30 and 32 which are serially coupled between reference voltage $V_{REF}$ and power supply conductor 34 operating at ground potential. Resistors 30 and 32 are selected to develop 2.0 volts at the base of transistor 28.

At initial power-up, the voltage across capacitor 36 is zero. Transistor 28 conducts a 2.0 milliamp charging current into capacitor 36 for a short period of time ($t_0$–$t_1$ of FIG. 2) until the voltage across capacitor 36 reaches 2.0 volts less the base-emitter junction potential ($V_{be}$) of transistor 28. At time $t_1$, transistor 38 is conducting and develops a voltage at loop node 40 equal to 2.0 volts from the base of transistor 28 less $V_{be}$ of transistor 28 plus $V_{be}$ of transistor 38. Current supply 41 continues to charge capacitor 36 with a 1.0 microamp trickle current from reference voltage $V_{REF}$. Current supply 41 must be kept small to minimize the value of capacitor 36 and the associated power consumption. Transistor 28 turns off as the voltage across capacitor 36 reaches 2.0 volts. Thus, quick-start circuit 26 reduces the start-up delay associated with switching regulator 10 by rapidly developing a minimum loop regulation voltage (2.0 volts) at loop node 40. Quick-start circuit 26 is disabled after loop node 40 reaches the minimum loop regulation voltage to conserve power.

Switching regulator 10 begins a "soft-start" operation described hereinafter without the substantial start-up delay noted in the prior art. The "soft-start" phase occurs between times $t_1$–$t_4$ of FIG. 2 during which loop regulation voltage 42 at node 40 increases. The regulating loop then controls loop regulation voltage 42 to maintain a predetermined output voltage $V_{OUT}$ of 5.0 volts during steady state operation.

Figure 2:
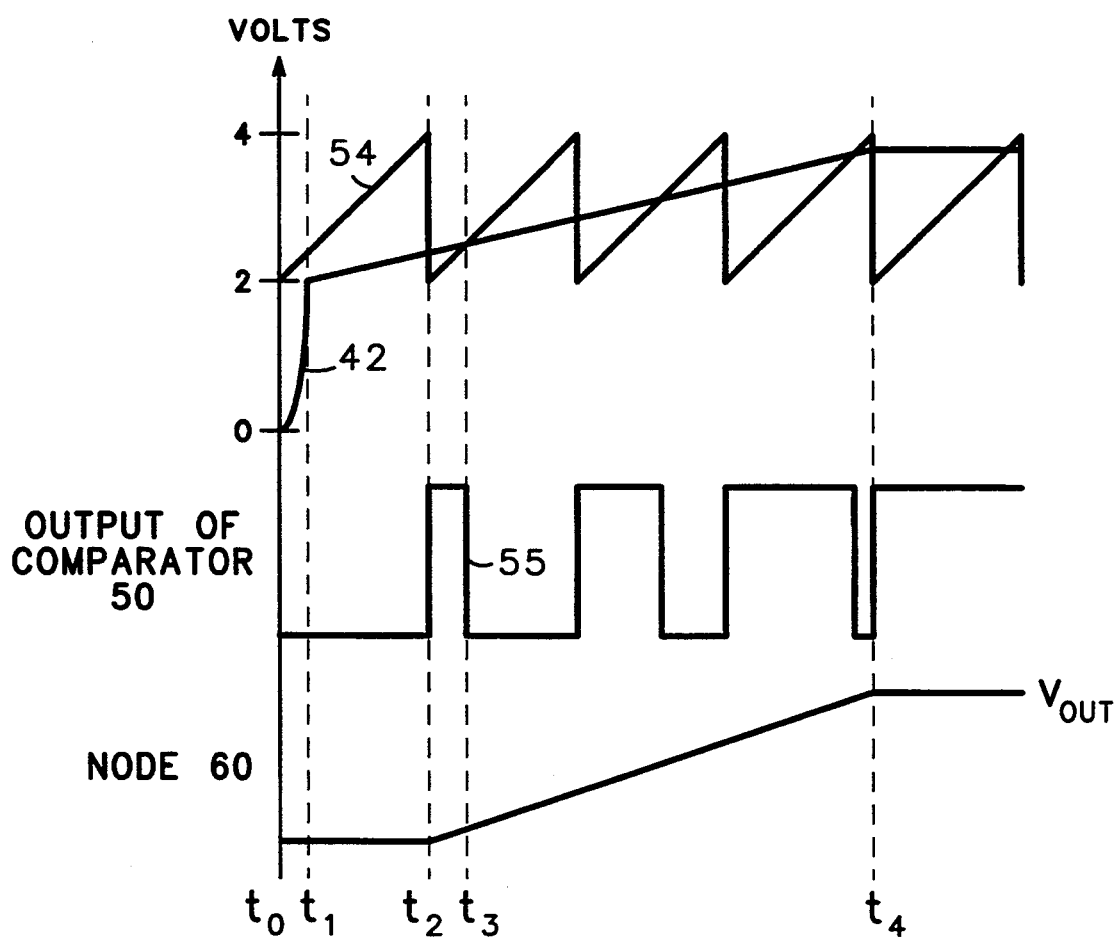
FIG. 2 is a waveform plot useful in the explanation of FIG. 1.

The reference voltage $V_{REF}$ enables current supply 44 to charge capacitor 46. Oscillator 48 produces a ramp waveform 54 at the inverting input of pulse width modulating comparator 50 at node 52. The ramp waveform 54 starts at 2.0 volts and ramps up to 4.0 volts, as shown in FIG. 2. While the voltage at node 52 is greater than the voltage at node 40 ($t_1$–$t_2$), the output signal 55 of comparator 50 switches low and produces a logic zero at the output of AND gate 20 which holds off switching power transistor 22. When the voltage at node 40 exceeds the voltage at node 52 between times $t_2$–$t_3$, the output signal 55 of comparator 50 switches high and turns on transistor 22. Load current flows through inductor 56 and charges capacitor 58 causing the output voltage $V_{OUT}$ at node 60 to increase as shown in FIG. 2. Transistor 22 turns off again after time $t_3$ as the ramp voltage at node 52 becomes greater than the loop regulation voltage at node 40 for the remainder of the ramp period. When transistor 22 turns off, the voltage across inductor 56 changes polarity thereby forward biasing Schottky diode 62 and allowing the current flowing through inductor 56 to continue charging capacitor 58. The longer the conduction time of transistor 22 within a period of the ramp waveform (longer duty cycle), the more energy is stored in inductor 56 and transferred to capacitor 58 to increase the output voltage $V_{OUT}$. It is the duty cycle of output signal 55 of comparator 50 that determines the amount of energy ultimately transferred to capacitor 58.

The output voltage $V_{OUT}$ is applied through resistor 64 to the inverting input of error amplifier 66. Resistor 68 and capacitor 70 provide compensation for amplifier 66 to establish a low bandwidth, say 20 Hz, and stabilize the regulation loop. Error amplifier 66 can only sink current, hence, current supply 72 sources current into node 40 when the output of amplifier 66 is high. A low output voltage $V_{OUT}$, less than the reference voltage $V_{REF}$ applied at the non-inverting input of amplifier 66, forces the output of amplifier 66 high allowing current supply 72 to source current into loop node 40. The voltage 42 at node 40 rises as shown in FIG. 2. When the output voltage $V_{OUT}$ reaches its steady state level at time $t_4$, error amplifier 66 continues to control the voltage at loop node 40 as necessary for comparator 50 to establish the proper duty cycle within the ramp waveform period for transistor 22 to conduct and maintain the desired average output voltage $V_{OUT}$.

The combination of transistor 22, inductor 56, capacitor 58 and diode 62 form a buck-type power converter. The collector of transistor 22 receives the input signal for the power converter while the base of transistor 22 receives a control signal from the regulation loop including error amplifier 66, comparator 50 and AND gate 20. The output voltage of the power converter is provided across capacitor 58.

Hence, a key feature of the present invention is the use of start-up circuit 26 during power-up to quickly set a minimum loop regulation voltage at loop node 40 to the lower end of the ramp waveform thereby eliminating start-up delay before the soft-start phase. Quick-start circuit 26 is disabled after loop node 40 reaches the minimum loop regulation voltage to conserve power.

Figure 3:
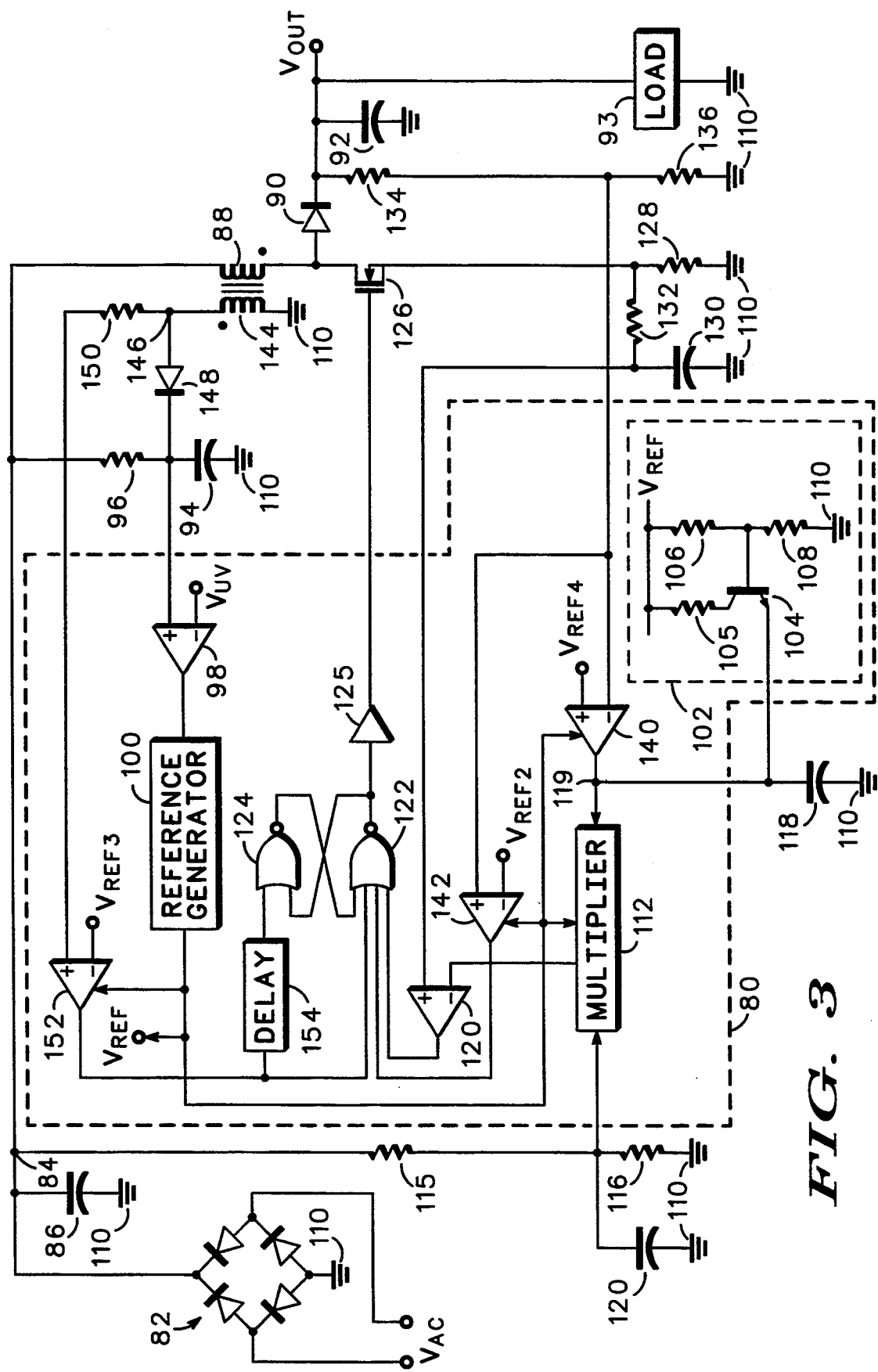
FIG. 3 is a schematic and block diagram illustrating a quick-start circuit and overvoltage detector for a second switching regulator.

Turning to FIG. 3, an AC-DC switching regulator 80 is shown suitable for manufacturing as an integrated circuit using conventional integrated circuit processes. Components shown external to switching regulator 80 are typically provided external to the IC. An input voltage $V_{AC}$ operating at 120 VAC is applied across full-wave rectifier 82 and produces a 120 Hz haversine waveform (rectified sinusoidal, 0–170 volts peak) at node 84. Capacitor 86 operates as a high frequency filter at node 84. A typical operating range for the input voltage $V_{AC}$ is between 92 and 138 VAC RMS, 60 Hz. The haversine waveform induces current to flow through inductor 88 and diode 90 to charge capacitor 92 and develop an output voltage $V_{OUT}$ of 170 volts across load 93. Capacitor 94 also charges by way of resistor 96.

Comparator 98 operates as an undervoltage lock-out with hysterisis to detect when the input voltage $V_{AC}$ is less than a predetermined threshold. When the voltage across capacitor 94 is less than a reference voltage $V_{UV}$ (10 volts), the output of comparator 98 is low and reference generator 100 produces a zero reference voltage $V_{REF}$ disabling switching regulator 80. When the voltage across capacitor 94 becomes greater than the voltage $V_{UV}$, the output of comparator 98 goes high at an enable input of reference generator 100 which develops reference voltage $V_{REF}$ operating at 7.0 volts. Thus, the undervoltage lock-out inhibits switching regulator 80 until the haversine voltage at node 84 from input voltage $V_{AC}$ charges capacitor 94 to a predetermined threshold.

As part of the present invention, quick-start circuit 102 includes transistor 104 having a collector coupled for receiving reference voltage $V_{REF}$ through current limiting resistor 105. The base of transistor 104 is coupled to the interconnection of voltage dividing resistors 106 and 108 which are serially coupled between reference voltage $V_{REF}$ and power supply conductor 110 operating at ground potential. Resistors 106 and 108 are selected to develop 1.8 volts at the base of transistor 104.

The valid input range of multiplier 112 is between 1.8 and 4.0 volts. The 0–170 volt haversine waveform from node 84 is divided down by resistors 115 and 116 to a 0.0–2.0 volt haversine and applied at the first input of multiplier 112. Multiplier 112 produces a linear output ranging from 0.0 volts, when the first input is 0.0 volts or the second input is 1.8 volts, to a maximum 1.5 volt output signal when the first input is 2.0 volts and the second input is 4.0 volts. Capacitor 113 operates as a high frequency filter at the first input of multiplier 112.

Quick-start circuit 102 brings the second input of multiplier 112 up to the minimum 1.8 volts operating point very rapidly, thereby avoiding a long start-up delay. As undervoltage lock-out comparator 98 enables reference generator 100 to produce reference voltage $V_{REF}$, transistor 104 conducts approximately 2.0 milliamps of current into capacitor 118 at loop node 119 to charge the second input of multiplier 112 to 1.8 volts. Once the voltage across capacitor 118 reaches 1.8 volts, transistor 104 turns off with a zero $V_{be}$ and quick-start circuit 102 is removed from the normal operation of switching regulator 80.

The output of multiplier 112 ranges from 0.0 to 1.5 volts into the inverting input of current sense comparator 120. The non-inverting input of comparator 120 is zero initially. NOR gates 122 and 124 operate as an RS latch with the reset input at NOR gate 122 and the set input at NOR gate 124. NOR gate 122 receives all logic zeroes at its inputs including from the output of comparator 120, thereby producing a high voltage through buffer 125 to the gate of power switching transistor 126. Transistor 126 turns on to conduct current through inductor 88 which develops a voltage across current sensing resistor 128. Diode 90 blocks discharge of capacitor 92 when transistor 126 conducts. The voltage across resistor 128 is applied through filtering capacitor 130 and resistor 132 to the non-inverting input of comparator 120. When the voltage across resistor 128 exceeds the output signal of multiplier 112, the output of comparator 120 goes high to reset latching NOR gates 122–124 and turn off transistor 126. Thus, comparator 120 operates to shut off transistor 126 when the current through inductor 88 and transistor 126 as sensed by resistor 128 exceeds a threshold from multiplier 112.

The output voltage $V_{OUT}$ is divided down by resistors 134 and 136 and applied at the inverting input of transconductance error amplifier 140. For low output voltage applications, the inverting input of error amplifier 140 may directly receive output voltage $V_{OUT}$. The non-inverting input of error amplifier 140 receives reference potential $V_{REF4}$ operating at 2.5 volts. The output current of amplifier 140 continues to charge capacitor 118 and increase the voltage at the second input of multiplier 112. The output signal of multiplier 112 increases accordingly thereby establishing a higher threshold at the inverting input of current sense comparator 120 to keep transistor 126 conducting longer during the haversine period before the voltage across resistor 128 resets latching NOR gates 122–124. The longer transistor 126 conducts (longer duty cycle), the more energy is stored by inductor 88, and the more energy is transferred to capacitor 92 during the off period of transistor 126. Output voltage $V_{OUT}$ increases accordingly. Transistor 126 switches with a frequency of 20 KHz to 150 KHz. Once the output voltage $V_{OUT}$ reaches the intended operating value of say 230 volts, error amplifier 140 charges capacitor 118 to an appropriate level to maintain a constant output voltage $V_{OUT}$.

As part of the present invention, overvoltage comparator 142 receives a reference voltage $V_{REF2}=2.7$ volts ($1.08*V_{REF4}$) at its inverting input and the divided down output voltage developed across resistor 136 at its non-inverting input. When the divided down output voltage exceeds the reference voltage $V_{REF2}$, possibly caused by removal of load 93, the output of comparator 142 goes high and resets NOR gates 122–124 to turn off transistor 126.

The regulation loop through error amplifier 140 operates at a low frequency, say 20 Hz and therefore cannot respond in time to an overvoltage condition to shut down transistor 126 before damage may occur. Comparator 142 provides immediate response to an overvoltage condition and disables transistor 126 by way of latching NOR gates 122–124. By using a transconductance type amplifier, the inverting input of error amplifier 140 may operate independently of its output. Thus, overvoltage comparator 142 may use the same output voltage $V_{OUT}$, or divided version thereof, as does error amplifier 140. The integrated circuit package containing switching regulator 80 uses the same pin to the inverting input of error amplifier 140 and to the non-inverting input of comparator 142.

At the point of the haversine cycle when transistor 126 shuts off and inductor 88 sources current into capacitor 92, the voltage across inductor 88 switches polarity producing a high voltage at the drain of transistor 126 and likewise across inductor 144 at node 146. Inductor 144 is magnetically coupled to inductor 88 as shown in FIG. 3. Diode 148 becomes forward biased to charge capacitor 94. The voltage at node 146 is also applied through resistor 150 to the non-inverting input of zero current detector comparator 152. The inverting input of comparator 152 receives reference voltage $V_{REF3}$ operating at 1.6 volts. With a high voltage at node 146, comparator 152 produces a logic one to reset NOR gates 122–124. The logic one from comparator 152 resets the latch through NOR gate 122 (logic zero at output of NOR gate 124) before the same logic one propagates through delay circuit 154 and changes the output state of NOR gate 124 to logic one. Thus, comparator 152 holds off transistor 126 until inductor 88 has dumped its energy to capacitor 92 (zero current through inductor 88). The voltage across inductors 88 and 144 decay to zero and the output signal of comparator 152 switches to logic zero, thereby removing the hold-off state from transistor 126. Diode 148 blocks discharge of capacitor 94 during the conducting times of transistor 126.

The combination of transistor 126, inductors 88 and 144, resistors 128, 132, 134 and 136, capacitors 92 and 130 and diode 90 form a flyback-type power converter. Inductor 88 receives the input signal for the power converter while the gate of transistor 126 receives a control signal from the regulation loop including error amplifier 140, multiplier 112, comparator 120 and NOR gates 122–124. The output voltage of the power converter is provided across capacitor 92. Resistor 128 provides a second output of the power converter with a signal proportional to the input current flowing through inductor 88 and transistor 126.

Hence, a key feature of the present invention is the use of start-up circuit 102 to set a minimum operating voltage at loop node 119 for the second input of multiplier 112 allowing the loop to begin regulating without a start-up delay. Moreover, comparator 142 detects any overvoltage condition and shuts off switching transistor 126. It is understood that the quick-start and overvoltage protection features may be used independently in the switching regulator circuit.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of the invention.

What is claimed is:

1. A switching regulator circuit, comprising:
   a power converter having an input, a control input and an output, said input receiving an input signal, said output being coupled to an output of the switching regulator circuit for providing an output voltage, said control input receiving a control signal to regulate said output voltage;
   a regulation loop having an input coupled to said output of said power converter and an output coupled to said control input of said power converter, said regulation loop developing a loop regulation voltage at a loop node for comparison against an oscillating signal to establish a duty cycle of said oscillating signal to control said output voltage of the switching regulator circuit, said regulation loop including,
   (a) an error amplifier having first and second inputs and an output, said first input receiving a first reference potential, said second input being coupled to said output of said power converter, said output providing said loop regulation voltage at said loop node,
   (b) a first transistor having a base, an emitter and a collector, said emitter being coupled to said loop node, said collector being coupled to a first power supply conductor,
   (c) a first capacitor coupled between said base of said first transistor and said first power supply conductor, and
   (d) a first comparator having first and second inputs and an output, said first input receiving said oscillating signal, said second input being coupled to said loop node, said output being coupled to said control input of said power converter; and
   circuit means having an output coupled to said base of said first transistor for increasing said loop regulation voltage during power-up of the switching regulator circuit until said loop regulation voltage reaches a predetermined value, said circuit means including,
   (e) a second transistor having a base, an emitter and a collector, said collector receiving said input signal, said emitter being coupled to said base of said first transistor, said base being coupled for receiving said first reference potential.

2. The switching regulator circuit of claim 1 wherein said circuit means further includes:
   a first resistor coupled between said first reference potential and said base of said second transistor; and
   a second resistor coupled between said base of said second transistor and said first power supply conductor.

3. The switching regulator circuit of claim 2 wherein said regulation loop further includes current supply means coupled between said first reference potential and said base of said second transistor.

4. The switching regulator circuit of claim 3 wherein said power converter includes:
   a third transistor having a base, an emitter and a collector, said collector receiving said input signal;
   a second capacitor coupled between said collector of said third transistor and said first power supply conductor;
   a diode having an cathode coupled to said emitter of said third transistor and having an anode coupled to said first power supply conductor;
   an inductor coupled between said emitter of said third transistor and said output of said power converter; and
   a third capacitor coupled between said output of said power converter and said first power supply conductor for developing said output voltage.

5. The switching regulator circuit of claim 4 further comprising:
   a second comparator having first and second inputs and an output, said first input receiving said first reference potential, said second input receiving a second reference potential; and
   an AND gate having first and second inputs and an output, said first input being coupled to said output of said first comparator, said second input being coupled to said output of said second comparator, said output being coupled to said base of said third transistor.

6. The switching regulator circuit of claim 5 further comprising:
   a third resistor coupled between said output of said power converter and said second input of said error amplifier;
   a fourth resistor and a fourth capacitor serially coupled between said second input of said error amplifier and said loop node; and
   second current supply means having an output coupled to said loop node for providing a current of predetermined magnitude.

7. A switching regulator circuit, comprising:
   a power converter having an input, a control input and an output, said input receiving an input signal, said output being coupled to an output of the switching regulator circuit for providing an output voltage, said control input receiving a control signal to regulate said output voltage, said power converter including a second output for providing a second output signal proportional to said input signal;
   an error amplifier having first and second inputs and an output, said first input receiving a first reference potential, said second input receiving said output voltage;
   a first capacitor coupled between said output of said error amplifier and a first power supply conductor;
   a first comparator having first and second inputs and an output, said first input being coupled to said second output of said power converter, said second input being coupled to said output of said error amplifier, said output being coupled to said control input of said power converter for providing said control signal; and circuit means having an output coupled to said output of said error amplifier for increasing a voltage across said first capacitor during power-up of the switching regulator circuit until said voltage across said first capacitor reaches a predetermined value, said circuit means including,
 (a) a first transistor having a base, an emitter and a collector, said collector and base being coupled to a source of reference potential, said emitter being coupled to said first capacitor.

8. The switching regulator circuit of claim 7 wherein said circuit means further includes:
a first resistor coupled between said source of reference potential and said base of said first transistor; and
a second resistor coupled between said base of said first transistor and said first power supply conductor.

9. The switching regulator circuit of claim 8 wherein said power converter includes:
a first inductor having a first terminal coupled for receiving said input signal and having a second terminal coupled to said output of said power converter;
a second transistor having a gate, a drain and a source, said drain being coupled to said second terminal of said first inductor;
a third resistor coupled between said source of said second transistor and said first power supply conductor;
a second capacitor coupled between said output of said power converter and said first power supply conductor for developing said output voltage;
first means coupled to said output of said power converter for reducing said output voltage and providing a divided-down output voltage at said second input of said error amplifier; and
second means coupled for receiving said input signal and providing a divided-down input voltage at an output.

10. The switching regulator circuit of claim 9 further comprising:
a multiplier circuit having first and second inputs and an output, said first input receiving said divided-down input voltage, said second input being coupled to said output of said error amplifier;
a first NOR gate having first and second inputs and an output, said first input being coupled to said output of said first comparator;
a second NOR gate having first input and an output, said first input being coupled to said output of said first NOR gate, said output being coupled to said second input of said first NOR gate; and
a buffer coupled between said output of said first NOR gate and said gate of said second transistor.

11. The switching regulator circuit of claim 10 wherein said first means includes fourth and fifth resistors serially coupled between said output of said power converter and said first power supply conductor for providing said divided-down output voltage at an interconnection of said fourth and fifth resistors.

12. The switching regulator circuit of claim 11 wherein said second means includes sixth and seventh resistors serially coupled between a source of said input signal and said first power supply conductor for providing said divided-down input voltage at an interconnection of said sixth and seventh resistors.

13. The switching regulator circuit of claim 12 further comprising:
an eighth resistor having a first terminal coupled to said source of said input signal and having a second terminal;
a third capacitor coupled between said second terminal of said eighth resistor and said first power supply conductor;
a second comparator having first and second inputs and an output, said first input receiving a second reference potential, said second input being coupled to said third capacitor; and
a reference voltage generator having an enable input coupled to said output of said second comparator and having an output for providing said source of reference voltage.

14. The switching regulator circuit of claim 13 further comprising:
a second inductor magnetically coupled to said first inductor;
a third comparator having first and second input and an output, said first input receiving a third reference potential, said second input being coupled to said second inductor, said output being coupled to a third input of said first NOR gate; and
a delay circuit coupled between said output of said third comparator and a second input of said second NOR gate.

15. A switching regulator circuit, comprising:
a power converter having an input, a control input and an output, said input receiving an input signal, said output being coupled to an output of the switching regulator circuit for providing an output voltage, said control input receiving a control signal to regulate said output voltage, said power converter including a second output for providing a second output signal proportional to said input signal;
an error amplifier having first and second inputs and an output, said first input receiving a first reference potential, said second input being coupled to said output of said power converter for receiving said output voltage;
a first capacitor coupled between said output of said error amplifier and a first power supply conductor;
a first comparator having first and second inputs and an output, said first input being coupled to said second output of said power converter, said second input being coupled to said output of said error amplifier, said output being coupled to said control input of said power converter for providing said control signal; and
a second comparator having first and second inputs and an output, said first input being coupled to said output of said power converter for receiving said output voltage, said second input receiving a second reference potential, said output being coupled to said control input of said power converter.

16. The switching regulator circuit of claim 15 wherein said power converter includes:
a first inductor having a first terminal coupled for receiving said input signal and having a second terminal coupled to said output of said power converter;

a first transistor having a gate, a drain and a source, said drain being coupled to said second terminal of said first inductor;

a first resistor coupled between said source of said first transistor and said first power supply conductor;

a second capacitor coupled between said output of said power converter and said first power supply conductor for developing said output voltage;

first means coupled to said output of said power converter for reducing said output voltage and providing a divided-down output voltage at an output; and second means coupled for receiving said input signal and providing a divided-down input voltage at an output.

17. The switching regulator circuit of claim 16 further including:

a multiplier circuit having first and second inputs and an output, said first input receiving said divided-down input voltage, said second input being coupled to said output of said error amplifier;

a first NOR gate having first, second and third inputs and an output, said first input being coupled to said output of said first comparator, said output being coupled to said gate of said first transistor; and a second NOR gate having a first input and an output, said first input being coupled to said output of said first NOR gate, said output being coupled to said second input of said first NOR gate.

18. The switching regulator circuit of claim 17 wherein said first means includes second and third resistors serially coupled between said output of said power converter and said first power supply conductor for providing said divided-down output voltage at an interconnection of said second and third resistors.

19. The switching regulator circuit of claim 18 wherein said second means includes fourth and fifth resistors serially coupled between a source of said input signal and said first power supply conductor for providing said divided-down input voltage at an interconnection of said fourth and fifth resistors.

20. The switching regulator circuit of claim 19 further comprising:

a sixth resistor having a first terminal coupled to said source of said input signal and having a second terminal;

a third capacitor coupled between said second terminal of said sixth resistor and said first power supply conductor;

a third comparator having first and second inputs and an output, said first input receiving a third reference potential, said second input being coupled to said third capacitor; and a reference voltage generator having an enable input coupled to said output of said third comparator and having an output for providing a source of reference voltage.

21. The switching regulator circuit of claim 20 further comprising:

a second inductor magnetically coupled to said first inductor;

a fourth comparator having first and second input and an output, said first input receiving a fourth reference potential, said second input being coupled to said second inductor, said output being coupled to said third input of said first NOR gate; and a delay circuit coupled between said output of said fourth comparator and a second input of said second NOR gate.

* * * * *